United States Patent
Mori et al.

(10) Patent No.: US 8,329,824 B2
(45) Date of Patent: Dec. 11, 2012

(54) PROPYLENE POLYMER COMPOSITIONS AND USES THEREOF

(75) Inventors: Ryoji Mori, Sodegaura (JP); Takashi Nakagawa, Sodegaura (JP); Akira Todo, Tokyo (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/558,076

(22) PCT Filed: May 12, 2004

(86) PCT No.: PCT/JP2004/006688
§ 371 (c)(1),
(2), (4) Date: Nov. 23, 2005

(87) PCT Pub. No.: WO2004/106430
PCT Pub. Date: Dec. 9, 2004

(65) Prior Publication Data
US 2006/0247381 A1    Nov. 2, 2006

(30) Foreign Application Priority Data

May 28, 2003  (JP) ................................ 2003-150875
Aug. 19, 2003  (JP) ................................ 2003-207919

(51) Int. Cl.
*C08L 23/00*    (2006.01)
*C08F 8/00*    (2006.01)
(52) U.S. Cl. ......... 525/240; 525/191; 525/232; 525/241
(58) Field of Classification Search .................... 525/240
See application file for complete search history.

(56) References Cited

U.S. PATENT DOCUMENTS

| | | | |
|---|---|---|---|
| 5,468,807 A * | 11/1995 | Tsurutani et al. ............. | 525/240 |
| 5,500,284 A | 3/1996 | Burgin et al. | |
| 5,637,367 A | 6/1997 | Asanuma et al. | |
| 5,840,389 A | 11/1998 | Asanuma et al. | |
| 6,642,316 B1 * | 11/2003 | Datta et al. ..................... | 525/240 |
| 6,943,215 B2 * | 9/2005 | Stevens et al. ................ | 525/191 |
| 2002/0086947 A1 * | 7/2002 | Burkhardt et al. ............. | 525/240 |

FOREIGN PATENT DOCUMENTS

| | | |
|---|---|---|
| EP | 0 400 333 A2 | 12/1990 |
| EP | 0 659 551 A1 | 6/1995 |
| EP | 1 118 638 A1 | 7/2001 |
| EP | 1 149 598 A2 | 10/2001 |
| EP | 1 593 710 A1 | 11/2005 |
| JP | 7-48485 A | 2/1995 |
| JP | 7-285201 A | 10/1995 |
| JP | 2000-191857 | 7/2000 |
| JP | 2001-171001 | 6/2001 |
| JP | 2003-313378 A | 11/2003 |
| KR | 0106973 | 5/1996 |
| WO | WO 00/01766 | 1/2000 |

OTHER PUBLICATIONS

Propylene polymers, Encyclopedia of Polymer Science and Technology, p. 301-302.*
R. Lieberman "Polypropylene Polymers", Abstract and Article, Oct. 2004.*

* cited by examiner

*Primary Examiner* — Ling Choi
*Assistant Examiner* — Gennadiy Mesh
(74) *Attorney, Agent, or Firm* — Foley & Lardner LLP

(57) ABSTRACT

The present invention provides a propylene polymer composition having excellent transparency, flexibility, heat resistance, scratch resistance and rubber elasticity with a good balance. The propylene polymer composition comprises 1 to 40 parts by weight of isotactic polypropylene (i) and 60 to 99 parts by weight of a propylene/ethylene/α-olefin copolymer (ii) which contains 45 to 89% by mol of a propylene component, 10 to 25% by mol of an ethylene component, and optionally, 0 to 30% by mol of constituent units (a) derived from an α-olefin of 4 to 20 carbon atoms.

18 Claims, No Drawings

US 8,329,824 B2

PROPYLENE POLYMER COMPOSITIONS AND USES THEREOF

FIELD OF THE INVENTION

The present invention relates to propylene polymer compositions, and more particularly to propylene polymer compositions having excellent transparency, flexibility, scratch resistance, heat resistance and rubber elasticity.

BACKGROUND OF THE INVENTION

Because polypropylene is inexpensive and has excellent rigidity, moisture resistance and heat resistance, it has been widely used as an automotive material, a household electric appliance material, etc. On the other hand, a tendency to get rid of non-rigid PVC is strengthened in view of problems of environmental hormones, dioxin and the like, and polyolefins having flexibility and transparency have been desired. In such circumstances, thermoplastic polyolefin elastomers called TPO have no transparency though they have excellent flexibility, and systems obtained by adding styrene elastomers to PP (e.g., Japanese Patent Laid-Open Publication No. 048485/1995) are expensive though they have flexibility and transparency, so that uses thereof are restricted.

DISCLOSURE OF THE INVENTION

The present invention is intended to solve such problems associated with the prior art as described above, and it is an object of the present invention to provide a propylene polymer composition which is inexpensive and has excellent transparency, flexibility, heat resistance, scratch resistance and rubber elasticity with a good balance.

The propylene polymer composition containing no styrene or ethylene block copolymer according to the present invention satisfies the following requirements (A), (B), (C) and (D) at the same time:

(A) in a dynamic viscoelasticity measurement (10 rad/s) in a torsion mode, a peak of loss tangent (tan δ) is present in the range of −25° C. to 25° C., and its value is not less than 0.5, (B) a ratio of a storage elastic modulus G' (20° C.) to a storage elastic modulus G' (100° C.) obtained from the above dynamic viscoelasticity measurement, G' (20° C.)/G' (100° C.), is not more than 5, (C) a penetration temperature (° C.), as measured in accordance with JIS K7196, is in the range of 100° C. to 168° C., and (D) a residual strain measured after the lapse of 10 minutes from unloading, said unloading being performed after a 100% strain is given under the conditions of a chuck distance of 30 mm and a pulling rate of 30 mm/min and kept for 10 minutes, is not more than 20%.

The propylene polymer composition according to the present invention comprises 1 to 40 parts by weight of isotactic polypropylene (i) and 60 to 99 parts by weight of a propylene/ethylene/α-olefin copolymer (ii) which contains 45 to 89% by mol of a propylene component, 10 to 25% by mol of an ethylene component, and optionally, 0 to 30% by mol of constituent units (a) derived from an α-olefin of 4 to 20 carbon atoms (the amount of at least one of the ethylene component and the constituent units (a) derived from an α-olefin of 4 to 20 carbon atoms is not 0% by mol), and has a tensile modulus (YM), as measured in accordance with JIS 6301, of not more than 100 MPa.

In a preferred embodiment of the present invention, the constituent unit (a) derived from an α-olefin of 4 to 20 carbon atoms is 1-butene and/or 1-octene.

The propylene polymer composition according to the present invention has excellent transparency, flexibility, heat resistance, scratch resistance and rubber elasticity with a good balance.

PREFERRED EMBODIMENTS OF THE INVENTION

The propylene polymer composition according to the present invention is described in detail hereinafter. First, the components (i) and (ii) contained in the propylene polymer composition are described.

Isotactic Polypropylene (i)

In the present invention, a specific propylene polymer having the following properties is employed. The propylene polymer may be homopolypropylene or a propylene/α-olefin random polymer or a propylene block copolymer, with the proviso that it has the following properties. However, preferable is homopolypropylene or a propylene/α-olefin random copolymer.

The isotactic polypropylene (i) for use in the present invention has a melt flow rate (MFR, ASTM D 1238, 230° C., under a load of 2.16 kg) of 0.01 to 400 g/10 min, preferably 0.5 to 90 g/10 min, and has a melting point, as measured by DSC, of not lower than 120° C., preferably not lower than 130° C., more preferably not lower than 150° C.

From the isotactic polypropylene (i) having such a MFR value, a propylene polymer composition having excellent flowability and capable of being molded into a large article is obtained. A composition prepared from isotactic polypropylene having a MFR value exceeding 400 g/10 min sometimes has poor impact resistance (Izod impact strength).

When the isotactic polypropylene (i) is a propylene/α-olefin random copolymer, the α-olefin is preferably selected from ethylene and/or α-olefins of 4 to 20 carbon atoms, and such ethylene and/or α-olefin is desirably contained in an amount of 0.3 to 7% by mol, preferably 0.3 to 6% by mol, more preferably 0.3 to 5% by mol.

A content of a room temperature n-decane soluble component in a propylene polymer can be determined by immersing 5 g of a sample (propylene polymer) in 200 cc of boiling n-decane for 5 hours to dissolve the sample, then cooling the solution to room temperature, filtering off a precipitated solid phase through a G4 glass filter, then drying the solid phase, measuring a weight of the solid phase and counting back the content of the n-decane soluble component from the weight of the solid phase.

The isotactic polypropylene (i) for use in the present invention can be prepared by various processes, and for example, it can be prepared by the use of a stereospecific catalyst. More specifically, it can be prepared by the use of a catalyst formed from a solid titanium catalyst component, an organometallic compound catalyst component, and if necessary, an electron donor. The solid titanium catalyst component is, for example, a solid titanium catalyst component in which titanium trichloride or a titanium trichloride composition is supported on a carrier having a specific surface area of not less than 100 m²/g or a solid titanium catalyst component which contains magnesium, halogen, an electron donor (preferably an aromatic carboxylic acid ester or an alkyl group-containing ether) and titanium as essential components and in which these essential components are supported on a carrier having a specific surface area of not less than 100 m²/g. The isotactic polypropylene can be prepared also by the use of a metallocene catalyst. Of these, the latter solid titanium catalyst component is preferable.

As the organometallic compound catalyst component, an oragnoaluminum compound is preferable. Examples of the organoaluminum compounds include trialkylaluminum, dialkylaluminum halide, alkylaluminum sesquihalide and alkylaluminum dihalide. The organoaluminum compound can be properly selected according to the type of the titanium catalyst component used.

As the electron donor, an organic compound having a nitrogen atom, a phosphorus atom, a sulfur atom, a silicon atom, a boron atom or the like is employable, and preferable is an ester compound or an ether compound having such an atom.

The catalyst may be activated by a means such as copulverization, and may be a catalyst onto which such an olefin as previously described has been prepolymerized.

Propylene/ethylene/α-olefin Random Copolymer (ii)

The propylene/ethylene/α-olefin random copolymer contains a propylene component in an amount of 45 to 89% by mol, preferably 45 to 80% by mol, more preferably 50 to 75% by mol, an ethylene component in an amount of 10 to 25% by mol, preferably 10 to 23% by mol, more preferably 12 to 23% by mol, and if necessary, constituent units (a) derived from an α-olefin of 4 to 20 carbon atoms in an amount of 0 to 30% by mol, preferably 0 to 25% by mol, more preferably 0 to 20% by mol.

The propylene/ethylene/α-olefin random copolymer (ii) containing a propylene component, an ethylene component, and if necessary, an α-olefin component of 4 to 20 carbon atoms in the above amounts exhibits excellent compatibility with the isotactic polypropylene, and the resulting propylene polymer composition tends to exhibit sufficient transparency, flexibility, heat resistance and scratch resistance.

The propylene/ethylene/α-olefin random copolymer (ii) desirably has an intrinsic viscosity [η], as measured in decalin at 135° C., of usually 0.01 to 10 dl/g, preferably 0.05 to 10 dl/g. When the intrinsic viscosity [η] of the propylene/ethylene/α-olefin random copolymer (ii) is in the above range, this propylene/ethylene/α-olefin random copolymer is excellent in properties such as weathering resistance, ozone resistance, thermal aging resistance, low-temperature characteristics and dynamic fatigue resistance.

The propylene/ethylene/α-olefin random copolymer (ii) has a stress (M100) at 100% strain, as measured in accordance with JIS K6301 using a JIS No. 3 dumbbell under the conditions of a span of 30 mm, a pulling rate of 30 mm/min and a temperature of 23° C., of not more than 4 MPa, preferably not more than 3 MPa, more preferably not more than 2 Mpa. When the stress is in this range, the propylene/ethylene/α-olefin-random copolymer (ii) exhibits excellent flexibility, transparency and rubber elasticity.

The propylene/ethylene/α-olefin random copolymer (ii) has a crystallinity, as measured by X-ray diffractometry, of not more than 20%, preferably 0 to 15%. Further, the propylene/ethylene/α-olefin random copolymer (ii) has a single glass transition temperature, and the glass transition temperature Tg, as measured by a differential scanning calorimeter (DSC), is desirable to be usually not higher than −10° C., preferably not higher than −15° C. When the glass transition temperature Tg of the propylene/ethylene/α-olefin random copolymer (ii) is in the above range, the copolymer (ii) exhibits excellent low-temperature resistance and low-temperature characteristics.

In the case where a melting point (Tm, ° C.) is present in an endothermic curve of the propylene/ethylene/α-olefin random copolymer (ii) measured by a differential scanning calorimeter (DSC), the quantity of heat of fusion ΔH is not more than 30 J/g, and a C3 content (% by mol) and the quantity of heat of fusion ΔH (J/g) satisfy the following relationship:

$$\Delta H < 345\, Ln\, (C3\ content\ (\%\ by\ mol)) - 1492,$$

with the proviso that the C3 content satisfies the condition of 76≦C3 content (% by mol)≦90.

The propylene/ethylene/α-olefin random copolymer (ii) desirably has a molecular weight distribution (Mw/Mn, in terms of polystyrene, Mw: weight-average molecular weight, Mn: number-average molecular weight), as measured by GPC, of not more than 4.0, preferably not more than 3.0, more preferably not more than 2.5.

The propylene/ethylene/α-olefin random copolymer (ii) may be a copolymer a part of which has been graft modified with a polar monomer. Examples of the polar monomers include a hydroxyl group-containing ethylenically unsaturated compound, an amino group-containing ethylenically unsaturated compound, an epoxy group-containing ethylenically unsaturated compound, an aromatic vinyl compound, an unsaturated carboxylic acid or its derivatives, a vinyl ester compound and vinyl chloride.

The modified propylene/ethylene/α-olefin copolymer is obtained by graft polymerization of the propylene/ethylene/α-olefin random copolymer (ii) with the polar monomer. In the graft polymerization of the propylene/ethylene/α-olefin random copolymer (ii) with the polar monomer, the polar monomer is used in an amount of usually 1 to 100 parts by weight, preferably 5 to 80 parts by weight, based on 100 parts by weight of the propylene/ethylene/α-olefin random copolymer (ii). The graft polymerization is usually carried out in the presence of a radical initiator.

As the radical initiator, an organic peroxide, an azo compound or the like is employable.

The radical initiator can be used by mixing it as it is with the propylene/ethylene/α-olefin copolymer (ii) and the polar monomer, but it can be used after it is dissolved in a small amount of an organic solvent. As the organic solvent, any of organic solvents capable of dissolving the radical initiator can be used without specific restriction.

In the graft polymerization of the propylene/ethylene/α-olefin copolymer (ii) with the polar monomer, a reducing substance may be used. By the use of the reducing substance, the degree of grafting of the polar monomer can be increased.

The graft modification of the propylene/ethylene/α-olefin copolymer (ii) with the polar monomer can be carried out by a hitherto known method. For example, the graft modification can be carried out by dissolving the propylene/ethylene/α-olefin copolymer (ii) in an organic solvent, then adding a polar monomer, a radical initiator, etc. to the solution, and reacting them at a temperature of 70 to 200° C., preferably 80 to 190° C., for 0.5 to 15 hours, preferably 1 to 10 hours.

Further, the modified propylene/ethylene/α-olefin copolymer can be prepared also by reacting the propylene/ethylene/α-olefin random copolymer (ii) with the polar monomer using an extruder or the like in the absence of a solvent. It is desirable to carry out this reaction usually at a temperature of not lower than the melting point of the propylene/ethylene/α-olefin copolymer (ii), specifically, a temperature of 120 to 250° C., for a period of usually 0.5 to 10 minutes.

In the modified propylene/ethylene/α-olefin copolymer obtained as above, the degree of modification (degree of grafting of the polar monomer) is desirable to be in the range of usually 0.1 to 50% by weight, preferably 0.2 to 30% by weight, more preferably 0.2 to 10% by weight.

When the modified propylene/ethylene/α-olefin copolymer is contained in the propylene polymer composition of the present invention, the composition exhibits excellent adhesion to other resins and excellent compatibility with them, and moreover, wettability of a surface of a molded product obtained from the propylene polymer composition is sometimes improved.

Preparation of propylene/ethylene/α-olefin Random Copolymer (ii)

The propylene/ethylene/α-olefin random copolymer (ii) for use in the present invention can be prepared using the aforesaid metallocene catalyst for preparing the isotactic polypropylene (i) in the same manner as described above, or can be prepared using a metallocene catalyst, but the process employable is not limited thereto.

Styrene or Ethylene Block Copolymer

The styrene or ethylene block copolymer means an ethylene/α-olefin block copolymer (M) or an aromatic hydrocarbon block copolymer (N) described below.

Ethylene/α-olefin Block Copolymer (M)

The ethylene/α-olefin block copolymer (M) that is not contained in the propylene polymer composition of the present invention comprises a low-crystalline copolymer part and an amorphous copolymer part, said low crystalline copolymer part containing a crystalline polyethylene portion which comprises 5 to 40% by mol of constituent units derived from an olefin of 3 to 10 carbon atoms and 60 to 95% by mol of constituent units derived from ethylene.

Further, the ethylene/α-olefin block copolymer satisfies all the following requirements (1) to (3):

(1) the melting point (Tm) obtained from an endothermic curve of DSC and the ethylene content (C2) measured by a conventional NMR method satisfy the following relationship:

$Tm\ (°C.) > 3.9 \times C2\ (mol\ \%) - 230$, (2) the molecular weight distribution, as measured by GPC, is in the range of 1 to 1.5, and (3) the quantity of a n-decane soluble component at room temperature is in the range of 0 to 20% by weight.

The quantity of the 23° C. n-decane soluble component in the ethylene/α-olefin block copolymer is measured in the following manner. That is to say, in a 1-liter flask equipped with a stirrer, 3 g of a polymer sample, 20 mg of 2,6-di-tert-butyl-4-methylphenol and 500 ml of n-decane are placed, and they are heated on an oil bath at 145° C. to dissolve the polymer sample. After the polymer sample is dissolved, the solution is cooled to room temperature over a period of about 8 hours, followed by holding the solution on a water bath at 23° C. for 8 hours. A polymer precipitated and the n-decane solution containing a dissolved polymer are separated from each other by filtration using a glass filter of G-4 (or G-2) The thus obtained solution is heated under the conditions of 10 mmHg and 150° C. to dry the polymer dissolved in the n-decane solution until a constant weight is reached. This weight is taken as the quantity of the 23° C. decane soluble component. The quantity of the 23° C. n-decane soluble component in the ethylene/α-olefin block copolymer is calculated as a percentage based on the weight of the polymer sample.

Examples of the olefins of 3 to 20 carbon atoms include propylene, 1-butene, 1-pentene, 1-hexene, 4-methyl-1-pentene, 3-methyl-1-pentene, 1-octene, 3-methyl-1-butene, 1-decene, 1-dodecene, 1-tetradodecene, 1-hexadecene, 1-octadecene, 1-eicosene, cyclopentene, cycloheptene, norbornene, 5-ethyl-2-norbornene, tetracyclododecene and 2-ethyl-1,4,5,8-dimethano-1,2,3,4,4a,5,8,8a-octahydronaphthalene.

In the ethylene/α-olefin block copolymer, two or more kinds of the constituents derived from the olefins of 3 to 20 carbon atoms and ethylene may be contained.

In the ethylene/α-olefin block copolymer referred to herein, constituent units derived from a diene compound of 4 to 20 carbon atoms may be contained in an amount of not more than 5% by mol.

Examples of such diene compounds include 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidenenorbornene, vinylnorbornene and dicyclopentadiene.

Preparation of the ethylene/α-olefin block copolymer (M) is described in, for example, Japanese Patent Laid-Open Publication No. 043770/1993.

Aromatic Hydrocarbon Block Copolymer (N)

The aromatic hydrocarbon block copolymer (N) that is not contained in the propylene polymer composition of the present invention is an aromatic vinyl/conjugated diene block copolymer (N1) comprising block polymerization units (X) derived from aromatic vinyl and block polymerization units (Y) derived from conjugated diene, or its hydrogenation product (N2).

The aromatic vinyl/conjugated diene block copolymer (N1) of such a constitution is represented by, for example, $X(YX)_n$ or $(XY)_n$ (n is an integer of 1 or greater)

In such a styrene block copolymer, the aromatic vinyl block polymerization unit (X) that is a hard segment is present as a crosslinking point of the conjugated diene block polymerization unit (Y) and forms physical crosslinking (domain). The conjugated diene block polymerization unit (Y) present between the aromatic vinyl block polymerization units (X) is a soft segment and has rubber elasticity.

Examples of the aromatic vinyls for forming the block polymerization units (X) include styrene, and styrene derivatives, such as α-methylstyrene, 3-methylstyrene, p-methylstyrene, 4-propylstyrene, 4-dodecylstyrene, 4-cyclohexylstyrene, 2-ethyl-4-benzylstyrene and 4-(phenylbutyl)styrene. Examples of the conjugated dienes for forming the block polymerization units (Y) include butadiene, isoprene, pentadiene, 2,3-dimethylbutadiene and combinations thereof. When the conjugated diene block polymerization units (Y) are derived from butadiene and isoprene, the units derived from butadiene and isoprene are contained in amounts of not less than 40% by mol. The conjugated diene block polymerization unit (Y) may be any of a random copolymerization unit, a block copolymerization unit and a tapered copolymerization unit. The content of the aromatic vinyl polymerization units can be measured by a conventional method, such as infrared spectroscopy or NMR spectroscopy. The hydrogenation product (N2) of the aromatic vinyl/conjugated diene block copolymer can be obtained by hydrogenating the aromatic vinyl/conjugated diene block copolymer (N1) by a publicly known method. The hydrogenation. product (N2) of the aromatic vinyl/conjugated diene block copolymer usually has a degree of hydrogenation of not less than 90%. This degree of hydrogenation is a value given when the total amount of carbon-carbon double bonds in the conjugated diene block polymerization units (Y) is taken as 100%.

Propylene Polymer Composition

The propylene polymer composition containing no styrene or ethylene block copolymer according to the present invention satisfies the following requirements (A), (B), (C) and (D) at the same time. The expression "containing no styrene or ethylene block copolymer" means that the content of a styrene or ethylene block copolymer in the propylene polymer composition is not more than 10% by weight, preferably not more than 5% by weight, more preferably not more than 2% by weight.

(A) In a dynamic viscoelasticity measurement (10 rad/s) in a torsion mode, a peak of loss tangent (tan δ) is present in the range of −25° C. to 25° C., and its value is not less than 0.5.

(B) A ratio of a storage elastic modulus G' (20° C.) to a storage elastic modulus G' (100° C.) obtained from the above dynamic viscoelasticity measurement, G' (20° C.)/G' (100° C.), is not more than 5.

(C) A penetration temperature (° C.), as measured in accordance with JIS K7196, is in the range of 100° C. to 168° C.

(D) A residual strain measured after the lapse of 10 minutes from unloading, said unloading being performed after a 100% strain is given under the conditions of a chuck distance of 30 mm and a pulling rate of 30 mm/min and kept for 10 minutes, is not more than 20%.

In the requirement (A), the loss tangent (tan δ) in the range of −25° C. to 25° C. is not less than 0.5, preferably 0.5 to 2.5, more preferably 0.6 to 2. If the loss tangent (tan δ) in the range of −25° C. to 25° C. is less than 0.5, there is a tendency that flexibility cannot be exhibited sufficiently, or even if flexibility is exhibited, scratch resistance tends to be deteriorated.

In the requirement (B), the ratio of a storage elastic-modulus G' (20° C.) to a storage elastic modulus G' (100° C.), G' (20° C.)/G' (100° C.), is not more than 5, preferably not more than 4, more preferably not more than 3.5. If the ratio of a storage elastic modulus G' (20° C.) to a storage elastic modulus G' (100° C.), G' (20° C.)/G' (100° C.), exceeds 5, there is a tendency that surface tackiness occurs, handling is deteriorated and sufficient heat resistance cannot be exhibited.

In the requirement (C), the penetration temperature (° C.), as measured in accordance with JIS K7196, is in the range of 100° C. to 168° C., preferably 120° C. to 168° C., more preferably 140° C. to 168° C. If the penetration temperature is lower than 100° C., application for uses where heat sterilization etc. is required becomes infeasible.

In the requirement (D), a residual strain measured in the following manner is not more than 20%, preferably not more than 18%, more preferably not more than 16%. That is to say, to a dumbbell specimen having a length of 50 mm, a width of 5 mm and a thickness of 1 mm$^t$, a 100% strain is given under the conditions of a distance between marked lines of 30 mm and a pulling rate of 30 mm/min. The specimen is held in this state for 10 minutes and then unloaded, and after the lapse of 10 minutes from the unloading, a residual strain is measured. If the residual strain exceeds 20%, rubber elasticity tends to be lowered, and hence, application for uses where elastic properties or restoration properties are required becomes infeasible.

The propylene polymer composition having the above properties (A) to (D) comprises the isotactic polypropylene (i) in an amount of 1 to 40 parts by weight, preferably 1 to 30 parts by weight, more preferably 1 to 25 parts by weight, and the propylene/ethylene/α-olefin copolymer (ii) in an amount of 60 to 99 parts by weight, preferably 70 to 99 parts by weight, more preferably 75 to 99 parts by weight, said copolymer (ii) containing 45 to 89% by mol of a propylene component, 10 to 25% by mol of an ethylene component, and if necessary, 0 to 30% by mol of constituent units (a) derived from an α-olefin of 4 to 20 carbon atoms (the amount of at least one of the ethylene component and the constituent units (a) derived from an α-olefin of 4 to 20 carbon atoms is not 0% by mol).

A molded product comprising the propylene polymer composition desirably has a haze, as measured in accordance with ASTM D 1003, of not more than 25%, preferably not more than 20%.

A molded product comprising the propylene polymer composition desirably has a tensile modulus (YM), as measured in accordance with JIS 6301, of not more than 100 MPa, preferably not more than 80 MPa.

The propylene polymer composition of the present invention has a melt flow rate (ASTM D 1238, 230° C., load of 2.16 kg) of usually 0.0001 to 1000 g/10 min, preferably 0.0001 to 900 g/10 min, more preferably 0.0001 to 800 g/10 min, and has an intrinsic viscosity [η], as measured in decahydronaphthalene at 135° C., of usually 0.01 to 10 dl/g, preferably 0.05 to 10 dl/g, more preferably 0.1 to 10 dl/g.

In an endothermic curve of the propylene polymer composition of the present invention measured by a differential scanning calorimeter (DSC), a maximum peak of a melting point (Tm, ° C.) is present at not lower than 100° C., and its quantity of heat of fusion is in the range of preferably 5 to 40 J/g, more preferably 5 to 35 J/g.

The highest endothermic peak (melting point) of the propylene polymer composition of the present invention is not lower than 130° C., preferably not lower than 140° C., more preferably not lower than 160° C.

The propylene polymer composition of the present invention has a melt tension (MT) of usually 0.5 to 10 g, preferably 1 to 10 g, and this composition is excellent in moldability such as film or tube moldability. The melt tension (MT) is determined as a tension that is applied to a filament when a strand extruded under the conditions of a measuring temperature of 200° C. and an extrusion rate of 15 mm/min is taken off at a constant rate (10 m/min), and is measured by a melt tension tester (manufactured by Toyo Seiki Seisaku-sho Ltd.).

Preparation of Propylene Polymer Composition

The propylene polymer composition can be prepared by various processes publicly known using the above components in the above amounts. For example, a multi-step polymerization process, a mixing process using a Henschel mixer, a V-blender, a ribbon blender, a tumbling blender or the like, and a process comprising mixing, then melt kneading using a single-screw extruder, a twin-screw extruder, a kneader, a Banbury mixer or the like, and granulation or pulverization are adoptable.

In the isotactic propylene copolymer composition of the present invention, additives, such as weathering stabilizer, heat stabilizer, anti-static agent, anti-slip agent, anti-blocking agent, anti-fogging agent, lubricant, pigment, dye, plasticizer, anti-aging agent, hydrochloric acid absorbing agent and antioxidant, may be added when needed, within limits not prejudicial to the objects of the present invention. Further, "other copolymers" (elastomers) described below in detail may be added within limits not prejudicial to the objects of the present invention, without departing from the subject matter of the present invention.

Other Copolymers

In the propylene polymer composition of the present invention, "other copolymers" (elastmers, elastomeric resins) may be contained when needed.

Examples of the "other copolymers" include an ethylene/α-olefin random copolymer (iii), an ethylene/diene copolymer (iv) and an ethylene/triene copolymer (v). The copolymers are used singly or in combination of two or more kinds.

These "other copolymers" may be contained in amounts of usually 0 to 30 parts by weight, preferably 0 to 20 parts by weight, based on 100 parts by weight of the isotactic polypropylene polymer of the present invention. When these copolymers are used in such amounts, a composition capable of producing a molded product having a good balance of flexibility, transparency and low-temperature impact resistance is obtained.

Ethylene/α-olefin Random Copolymer (iii)

As the ethylene/α-olefin random copolymer (iii) for use in the present invention, a soft ethylene/α-olefin copolymer having a density of not less than 0.860 g/cm$^3$ and less than 0.895 g/cm$^3$, preferably 0.860 to 0.890 g/cm$^3$, and having a melt flow rate (MFR, ASTM D 1238, 190° C., load of 2.16 kg) of 0.5 to 30 g/10 min, preferably 1 to 20 g/10 min, is desirable.

Examples of the α-olefins to be copolymerized with ethylene include α-olefins of 3 to 20 carbon atoms, such as propylene, 1-butene, 1-pentene, 1-hexene, 1-heptene, 1-octene, 1-nonene, 1-decene, 1-undecene, 1-dodecene, 1-hexadecene, 1-octadence, 1-nonadecne, 1-eicosene and 4-methyl-1-pentene. Of these, α-olefins of 3 to 10 carbon atoms are preferable. These α-olefins are used singly or in combination of two or more kinds.

The ethylene/α-olefin random copolymer (iii) desirably contains units derived from ethylene in amounts of 60 to 90% by mol and units derived from the α-olefin of 3 to 20 carbon atoms in amounts of 10 to 40% by mol.

The ethylene/α-olefin random copolymer (iii) may further contain units derived from other polymerizable monomers in addition to the above units, within limits not prejudicial to the objects of the present invention.

Examples of the other polymerizable monomers include:
vinyl compounds, such as styrene, vinylcyclopentene, vinylcyclohexane and vinylnorbonane;
vinyl esters, such as vinyl acetate;
unsaturated organic acids, such as maleic anhydride or their derivatives;
conjugated dienes, such as butadiene, isoprene, pentadiene and 2,3-dimethylbutadiene; and
non-conjugated polyenes, such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,2-norbornadiene.

In the ethylene/α-olefin random copolymer (iii), units derived from the above-mentioned other polymerizable monomers may be contained in amounts of not more than 10% by mol, preferably not more than 5% by mol, more preferably not more than 3% by mol.

Examples of the ethylene/α-olefin random copolymers (iii) include an ethylene propylene random copolymer, an ethylene/1-butene random copolymer, an ethylene/propylene/1-butene random copolymer, an ethylene/propylene/ethylidenenorbornene random copolymer, an ethylene/1-hexene random copolymer and an ethylene/1-octene random copolymer. Of these, an ethylene/propylene random copolymer, an ethylene/1-butene random copolymer, an ethylene/1-hexene random copolymer and an ethylene/1-octene random copolymer are particularly preferably used. These copolymers may be used in combination of two or more kinds.

The ethylene/α-olefin random copolymer (iii) for use in the present invention has a crystallinity, as measured by X-ray diffractometry, of not more than 40%, preferably 0 to 39%, more preferably 0 to 35%.

The ethylene/α-olefin random copolymer can be prepared by a hitherto known process using a vanadium catalyst, a titanium catalyst, a metallocene-catalyst or the like.

In the isotactic polypropylene composition, the ethylene/α-olefin random copolymer (iii) may be contained in an amount of usually 0 to 40% by weight, preferably 0 to 35% by weight. When the ethylene/α-olefin random copolymer (iii) is used in such an amount, a composition capable of producing a molded product having a good balance of rigidity, hardness, transparency and impact resistance is obtained.

Ethylene/diene Copolymer (iv)

The ethylene/diene copolymer (iv) used as an elastomer in the present invention is a random copolymer of ethylene and diene.

Examples of the dienes to be copolymerized with ethylene include:
non-conjugated dienes, such as dicyclopentadiene, 1,4-hexadiene, cyclooctadiene, methylenenorbornene and ethylidenenorbornene; and
conjugated dienes, such as butadiene and isoprene.

Of these, butadiene and isoprene are preferable. These dienes are used singly or in combination of two or more kinds.

In the ethylene/diene copolymer (iv) for use in the present invention, the content of units derived from the diene is desirable to be in the range of usually 0.1 to 30% by mol, preferably 0.1 to 20% by mol, more preferably 0.5 to 15% by mol. The ethylene/diene copolymer (iv) desirably has an iodine value of usually 1 to 150, preferably 1 to 100, more preferably 1 to 50. Further, the ethylene/diene copolymer (iv) desirably has an intrinsic viscosity [η], as measured in decahydronaphthalene at 135° C., of 0.01 to 10 dl/g, preferably 0.05 to 10 dl/g, more preferably 0.1 to 10 dl/g. The ethylene/diene copolymer (iv) can be prepared by a hitherto known process.

In the isotactic polypropylene composition, the ethylene/diene copolymer (iv) may be contained in an amount of usually 0 to 40% by weight, preferably 0 to 35% by weight. When the ethylene/diene copolymer (iv) is used in such an amount, a composition capable of producing a molded product having a good balance of rigidity, hardness, transparency and impact resistance is obtained.

Ethylene/triene Copolymer (v)

The ethylene/triene copolymer (v) used as an elastomer in the present invention is a random copolymer of ethylene and triene.

Examples of the trienes to be copolymerized with ethylene include:

non-conjugated trienes, such as 6,10-dimethyl-1,5,9-undecatriene, 4,8-dimethyl-1,4,8-decatriene, 5,9-dimethyl-1,4,8-decatriene, 6,9-dimethyl-1,5,8-decatriene, 6,8,9-trimethyl-1,5,8-decatriene, 6-ethyl-10-methyl-1,5,9-undecatriene, 4-ethylidene-1,6-octadiene, 7-methyl-4-ethylidene-1,6-octadiene, 4-ethylidene-8-methyl-1,7-nonadiene (EMND), 7-methyl-4-ethylidene-1,6-nonadiene, 7-ethyl-4-ethylidene-1,6-nonadiene, 6,7-dimethyl-4-ethylidene-1,6-octadiene, 6,7-dimethyl-4-ethylidene-1,6-nonadiene, 4-ethylidene-1,6-decadiene, 7-methyl-4-ethylidene-1,6-decadiene, 7-methyl-6-propyl-4-ethylidene-1,6-octadiene, 4-ethylidene-1,7-nonadiene, 8-methyl-4-ethylidene-1,7-nonadiene and 4-ethylidene-1,7-undecadiene; and conjugated trienes, such as 1,3,5-hexatriene.

These trienes can be used singly or in combination or two or more kinds.

The above trienes can be prepared by hitherto known processes described in, for example, EPO691354A1 and WO96/20150.

In the ethylene/triene copolymer (v) for use in the present invention, the content of units derived from the triene is desirable to be in the range of usually 0.1 to 30% by mol, preferably 0.1 to 20% by mol, more preferably 0.5 to 15% by mol. The ethylene/triene copolymer (v) desirably has an iodine value of usually 1 to 200, preferably 1 to 100, more preferably 1 to 50.

Further, the ethylene/triene copolymer (v) desirably has an intrinsic viscosity [η], as measured in decahydronaphthalene at 135° C., of 0.01 to 10 dl/g, preferably 0.05 to 10 dl/g, more preferably 0.1 to 10 dl/g.

The ethylene/triene copolymer (v) can be prepared by a hitherto known process.

In the isotactic polypropylene composition, the ethylene/triene copolymer (v) may be contained in an amount of usually 0 to 40% by weight, preferably 0 to 35% by weight. When the ethylene/triene copolymer (v) is used in such an amount, a composition capable of producing a molded product having a good balance of rigidity, hardness, transparency and impact resistance is obtained.

In the propylene polymer composition of the present invention, a softener (vi) and an inorganic filler (vii) can be used when needed. Examples of the softeners (vi) include petroleum type substances, such as process oil, lubricating oil, paraffin, liquid paraffin, petroleum asphalt and vaseline; coal tars, such as coal tar and coal tar pitch; fatty oils, such as castor oil, linseed oil, rapeseed oil, soybean oil and coconut oil; waxes, such as tall oil, beeswax, carnauba wax and lanolin; fatty acids or their metal salts, such as ricinolic acid, palmitic acid, stearic acid, barium stearate and calcium stearate; synthetic high-molecular materials, such as petroleum resin, coumarone-indene resin and atactic polypropylene; ester type plasticizers, such as dioctyl phthalate, dioctyl adipate and dioctyl sebacate; and others, such as microcrystalline wax, factice, liquid polybutadiene, modified-liquid polybutadiene and liquid Thiokol.

In the present invention, the softener (vi) is used in an amount of not more than 200 parts by weight, preferably 2 to 100 parts by weight, based on the total 100 parts by weight of the isotactic polypropylene (i) and the propylene/ethylene/α-olefin copolymer (ii). If the amount of the softener (vi) used in the present invention exceeds 200 parts by weight, heat resistance and heat aging resistance of the resulting thermoplastic elastomer composition tend to be lowered.

Examples of the inorganic fillers (vii) which may be used in the present invention when needed include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bead, Shirasu balloon, calcium hydroxide and aluminum hydroxide.

In the present invention, the inorganic filler (vii) is used in an amount of not more than 200 parts by weight, preferably 2 to 200 parts by weight, based on the total 100 parts by weight of the isotactic polypropylene (i) and the propylene/ethylene/α-olefin copolymer (ii). If the amount of the inorganic filler (vii) used in the present invention exceeds 200 parts by weight, rubber elasticity and molding processability of the resulting thermoplastic elastomer composition tend to be lowered.

Molded Product Comprising Propylene Polymer Composition

The propylene polymer composition of the present invention can be widely applied to hitherto known uses of polyolefins. In particular, the polyolefin composition can be used by molding it into, for example, sheets, unstretched or stretched films, filaments and molded products of other various forms. The molded product comprising the propylene polymer composition of the present invention may be a multilayer laminate. The multilayer laminate has at least one layer containing the propylene polymer composition, and examples of such laminates include a multilayer film, a multilayer sheet, a multilayer container, a multilayer tube and a multilayer coating laminate contained as a constituent unit of a water paint.

Examples of the molded products include those obtained by thermoforming methods publicly known, such as extrusion molding, injection molding, inflation molding, blow molding, extrusion blow molding, injection blow molding, press molding, vacuum molding, calender molding and foam molding. The molded product is described with reference to the following some examples.

In the case where the molded product of the present invention is an extrusion molded product, its form or type is not specifically restricted. For example, there can be mentioned sheet, film (unstretched), pipe, hose, wire coating and tube. In particular, sheet (skin material), film, tube, catheter, monofilament (nonwoven fabric) and the like are preferable.

For extrusion molding of the propylene polymer composition, hitherto known extrusion apparatuses and molding conditions are adoptable. For example, by the use of a single-screw extruder, a kneading extruder, a ram extruder or a gear extruder, a molten propylene polymer composition is extruded from a specific die, whereby the composition can be molded into a desired form.

A stretched film can be obtained by stretching such an extruded sheet or an extruded film (unstretched) as mentioned above by a publicly known stretching method, such as tentering (lengthwise-crosswise stretching, crosswise-lengthwise stretching), simultaneous biaxial orientation or monoaxial stretching.

When the sheet or the unsretched film is stretched, the stretch ratio is in the range of usually about 20 to 70 times in case of biaxial orientation, and is in the range of usually about 2 to 10 times in case of monoaxial stretching. It is desirable to obtain a stretched film having a thickness of about 5 to 200 μm by stretching.

As the molded product in the form of a film, an inflation film may be produced. In the inflation molding, drawdown hardly takes place.

The molded product in the form of a sheet or a film comprising the propylene polymer composition of the present invention is hardly electrostatically charged and is excellent in rigidity (e.g., tensile modulus), heat resistance, stretchability, impact resistance, aging resistance, transparency, see-throuqh properties, gloss, moisture resistance and gas barrier properties, so that it can be widely used as a packaging film or the like. In this case, the molded product in the form of a sheet or a film comprising the propylene polymer composition may be a multilayer molded product, and the multilayer molded product has at least one layer of the propylene polymer composition.

A molded product in the form of a filament can be produced by, for example, extruding a molten propylene polymer composition through a spinneret. More specifically, a spanbond method or a meltblown method is preferably employed. The filament thus obtained may be further stretched. This stretching has only to be performed to such an extent that molecules are oriented at least monoaxially, and the stretching is desirably carried out in a stretch ratio of usually 5 to 10 times. The filament comprising the propylene polymer composition of the present invention is hardly electrostatically charged and is excellent in transparency, rigidity, heat resistance, impact resistance and stretchability.

An injection molded product can be produced by injection molding the propylene polymer composition into any of various forms using a hitherto known injection molding apparatus and adopting the publicly known conditions. The injection molded product comprising the propylene polymer composition of the present invention is hardly electrostatially charged and is excellent in transparency, rigidity, heat resistance, impact resistance, surface gloss, chemical resistance, abrasion resistance and the like, so that it can be widely used as automotive interior trim, automotive exterior trim, housing of household electric appliances, container or the like.

A blow molded product can be produced by blow molding the propylene polymer composition using a hitherto known blow molding apparatus and adopting the publicly known conditions. In this case, the blow molded product comprising the propylene polymer composition may be a multilayer molded product, and the multilayer molded product has at least one layer of the propylene polymer composition.

For example, in the extrusion blow molding, the propylene polymer composition in a molten state is extruded from a die at a resin temperature of 100° C. to 300° C. to form a tubular parison, then the parison is held in a mold of a desired shape, then air is blown, and the parison is fitted to the mold at a resin temperature of 130° C. to 300° C., whereby a hollow molded product can be produced. The stretch (blow) ratio is desirably in the range of 1.5 to 5 times in the crosswise direction.

In the injection blow molding, the propylene polymer composition is injected into a parison mold at a resin temperature of 100° C. to 300° C. to form a parison, then the parison is held in a mold of a desired shape, then air is blown, and the parison is fitted to the mold at a resin temperature of 120° C. to 300° C., whereby a hollow molded product can be produced. The stretch (blow) ratio is desirably in the range of 1.1 to 1.8 times in the lengthwise direction and in the range of 1.3 to 2.5 times in the crosswise direction.

The blow molded product comprising the propylene polymer composition of the present invention is excellent not only in transparency, flexibility, heat resistance and impact resistance but also in moisture resistance.

A press molded product is, for example, a mold stamping molded product. In the case where a substrate and a skin material are produced by press molding at the same time, i.e., composite integral molding (mold stamping molding), this substrate can be formed from the propylene polymer composition of the present invention.

Examples of the mold stamping molded products include automotive interior trim, such as door trim, rear package trim, seat back garnish and instrument panel.

The press molded product comprising the propylene polymer composition of the present invention is hardly electrostatically charged and is excellent in flexibility, heat resistance, transparency, impact resistance, aging resistance, surface gloss, chemical resistance, abrasion resistance and the like.

EFFECT OF THE INVENTION

According to the present invention, a propylene polymer composition capable of producing a molded product having excellent transparency, impact resistance, flexibility, heat resistance, scratch resistance and rubber elasticity with a good balance is obtained.

EXAMPLES

The present invention is further described with reference to the following examples, but it should be construed that the invention is in no way limited to those examples.

Conditions of physical property tests, etc. are described below.

Measurement of Dynamic Viscoelasticity

Dynamic viscoelasticity was measured in a torsion mode of a width of 10 mm and a length of 38 mm at 10 rad/s and a heating rate of 2° C./min in the temperature range of −100° C. to 100° C. by the use of RDS-II manufactured by Rheometric Scientific Inc., to obtain a loss tangent tan δ and a storage elastic modulus G' at each temperature.

Tensile Test

Residual Strain

A load was applied to a dumbbell specimen having a shape of a length of 50 mm, a length (LO) between marked lines of 30 mm, a width of 5 mm and a thickness of 1 mm$^r$ under the conditions of a chuck distance of 30 mm and a pulling rate of 30 mm/min to give a 100% strain (chuck distance: 60 mm) to the specimen. The specimen was held in this state for 10 minutes and then unloaded (free of load), and after the lapse of 10 minutes from unloading, a length (L) between marked lines was measured.

$$\text{Residual strain (\%)}=[(L-LO)/LO]\times 100$$

Tensile Modulus and M100 (Tensile Stress at 100% Strain)

Tensile modulus and M100 were measured using a JIS No. 3 dumbbell in accordance with JIS K 6301 under the conditions of a span of 30 mm, a pulling rate of 30 mm/min and a temperature of 23° C.

Penetration Temperature (° C.)

In this measurement, a test piece having a thickness of 1 mm was used, and a pressure of 2 kg/cm$^2$ was applied to a flat surface penetrator having a diameter of 1.8 mm at a heating rate of 5° C./min in accordance with JIS K7196 to obtain a TMA curve. From the TMA curve, a penetration temperature (° C.) was determined.

Haze

Using a test piece having a thickness of 1 mm, haze was measured by a digital haze meter "NDH-20D" manufactured by Nippon Denshoku Industries Co., Ltd.

Abrasion Resistance Test

A test piece having a thickness of 2 mm was abraded with a SUS abrasion indenter (470 g) of 45R, a tip of which had been covered with cotton canvas of #10, under the conditions of a temperature of 23° C., a number of reciprocation times of 100, a reciprocation rate of 33 times/min and a stroke of 100 mm by the use of a Gakushin abrasion tester manufactured by Toyo Seiki Seisaku-sho Ltd., and a change of gloss (ΔGloss) after the abrasion was determined as follows.

$$\Delta Gloss = (Gloss\ before\ abrasion - Gloss\ after\ abrasion) / Gloss\ before\ abrasion \times 100$$

Melting Point (Tm) and Glass Transition Temperature (Tg)

An endothermic curve of DSC was determined, and the temperature at the position of a maximum peak was taken as Tm. In this measurement, a sample was placed in an aluminum pan, heated up to 200° C. at 100° C./min, kept at 200° C. for 10 minutes, cooled down to −150° C. at 10° C./min and heated at 10° C./min to obtain an endothermic curve. From the endothermic curve, Tm was determined.

Intrinsic Viscosity [η]

Intrinsic viscosity was measured in decalin at 135° C.

Mw/Mn

Mw/Mn was measured in an orthodichlorobenzene solvent at 140° C. by means of GPC (gel permeation chromatography).

Synthesis Example 1

Synthesis of propylene/ethylene/butene Copolymer (ii-1)

In a 2000 ml polymerization apparatus having been thoroughly purged with nitrogen, 917 ml of dry hexane, 85 g of 1-butene and triisobutylaluminum (1.0 mmol) were placed at room temperature. The temperature in the polymerization apparatus was raised to 65° C., and the system was pressurized to 0.77 MPa with propylene. Thereafter, the pressure in the system was adjusted to 0.78 MPa with ethylene. Subsequently, a toluene solution in which 0.002 mmol of dimethylmethylene(3-tert-butyl-5-methylcyclopentadienyl)fluorenylzirconium dichloride and 0.6 mmol (in terms of aluminum) of methylaluminoxane (available from Tosoh Finechem Corporation) were contacted with each other was introduced into the polymerization apparatus. With maintaining the internal temperature at 65° C. and the internal pressure at 0.78 MPa with ethylene, polymerization was performed for 20 minutes, and then 20 ml of methanol was added to terminate the polymerization. After the pressure was released, a polymer was precipitated from the polymerization solution in 2 liters of methanol and then dried under vacuum at 130° C. for 12 hours. The amount of the polymer obtained was 60.4 g, and the polymer had an intrinsic viscosity [η] of 1.81 dl/g, a glass transition temperature Tg of −27° C., an ethylene content of 13% by mol, a butene content of 19% by mol and a molecular weight distribution (Mw/Mn), as measured by GPC, of 2.4. As for the quantity of heat of fusion in the measurement by DSC, a clear peak of fusion was not confirmed.

Synthesis Example 2

Synthesis of propylene/ethylene/butene Copolymer (ii-2)

In a 2000 ml polymerization apparatus having been thoroughly purged with nitrogen, 833 ml of dry hexane, 200 g of 1-butene and triisobutylaluminum (1.0 mmol) were placed at room temperature. The temperature in the polymerization apparatus was raised to 40° C., and the system was pressurized to 0.77 MPa with propylene. Thereafter, the pressure in the system was adjusted to 0.8 MPa with ethylene. Subsequently, a toluene solution in which 0.001 mmol of dimethylmethylene(3-tert-butyl-5-methylcyclopentadienyl)fluorenylzirconium dichloride and 0.3 mmol (in terms of aluminum) of methylaluminoxane (available from Tosoh Finechem Corporation) were contacted with each other was introduced into the polymerization apparatus. With maintaining the internal temperature at 40° C. and the internal pressure at 0.8 MPa with ethylene, polymerization was performed for 20 minutes, and then 20 ml of methanol was added to terminate the polymerization. After the pressure was released, a polymer was precipitated from the polymerization solution in 2 liters of methanol and then dried under vacuum at 130° C. for 12 hours. The amount of the polymer obtained was 41.4 g, and the polymer had an intrinsic viscosity [η] of 2.1 dl/g, a glass transition temperature Tg of −31° C., an ethylene content of 15% by mol, a butene content of 23% by mol and a molecular weight distribution (Mw/Mn), as measured by GPC, of 2.1. As for the quantity of heat of fusion in the measurement by DSC, a clear peak of fusion was not confirmed.

Synthesis Example 3

Synthesis of propylene/ethylene/butene Copolymer (ii-3)

In a 2000 ml polymerization apparatus having been thoroughly purged with nitrogen, 833 ml of dry hexane, 100 g of 1-butene and triisobutylaluminum (1.0 mmol) were placed at room temperature. The temperature in the polymerization apparatus was raised to 40° C., and the system was pressurized to 0.76 MPa with propylene. Thereafter, the pressure in the system was adjusted to 0.8 MPa with ethylene. Subsequently, a toluene solution in which 0.001 mmol of dimethylmethylene(3-tert-butyl-5-methylcyclopentadienyl)fluorenylzirconium dichloride and 0.3 mmol (in terms of aluminum) of methylaluminoxane (available from Tosoh Finechem Corporation) were contacted with each other was introduced into the polymerization apparatus. With maintaining the internal temperature at 40° C. and the internal pressure at 0.8 MPa with ethylene, polymerization was performed for 20 minutes, and then 20 ml of methanol was added to terminate the polymerization. After the pressure was released, a polymer was precipitated from the polymerization solution in 2 liters of methanol and then dried under vacuum at 130° C. for 12 hours. The amount of the polymer obtained was 36.4 g, and the polymer had an intrinsic viscosity [η] of 1.8 dl/g, a glass transition temperature Tg of −29° C., an ethylene content of 17% by mol, a butene content of 7% by mol and a molecular weight distribution (Mw/Mn), as measured by GPC, of 2.1. As for the quantity of heat of fusion in the measurement by DSC, a clear peak of fusion was not confirmed.

Synthesis Example 4

Synthesis of propylene/ethylene/butene Copolymer (ii-4)

In a 2000 ml polymerization apparatus having been thoroughly purged with nitrogen, 917 ml of dry hexane, 50 g of 1-butene and triisobutylaluminum (1.0 mmol) were placed at room temperature. The temperature in the polymerization apparatus was raised to 65° C., and the system was pressurized to 0.77 MPa with propylene. Thereafter, the pressure in the system was adjusted to 0.78 MPa with ethylene. Subsequently, a toluene solution in which 0.002 mmol of dimethylmethylene(3-tert-butyl-5-methylcyclopentadienyl)fluorenylzirconium dichloride and 0.6 mmol (in terms of aluminum) of methylaluminoxane (available from Tosoh Finechem Corporation) were contacted with each other was introduced into the polymerization apparatus. With maintaining the internal temperature at 40° C. and the internal pressure at 0.78 MPa with ethylene, polymerization was performed for 30 minutes, and then 20 ml of methanol was added to terminate the polymerization. After the pressure was released, a polymer was precipitated from the polymerization solution in 2 liters of methanol and then dried under vacuum at 130° C. for 12 hours. The amount of the polymer obtained was 46.4 g, and the polymer had an intrinsic viscosity [η] of 1.51 dl/g, a glass transition temperature Tg of −30° C., an ethylene content of 17% by mol, a butene content of 10% by mol and a molecular weight distribution (Mw/Mn), as measured by GPC, of 2.1. As for the quantity of heat of fusion in the measurement by DSC, a clear peak of fusion was not confirmed.

Synthesis Example 5

Synthesis of propylene/ethylene/butene Copolymer (ii-5)

In a 1.5-liter autoclave having been vacuum dried and purged with nitrogen, 675 ml of heptane was placed at room temperature. Subsequently, 0.3 ml of a toluene solution of triisobutylaluminum (abbreviated to TIBA hereinafter) of 1.0 mmol/ml was added so that the amount of the toluene solution in terms of aluminum atom might become 0.3 mmol, then with stirring, 28.5 liters of propylene (25° C., 1 atm) and 5 liters of 1-butene (25° C., 1 atm) were added, and the temperature was raised to reach 60° C. Thereafter, the system was pressurized to 6.0 kg/cm²G with ethylene, and 7.5 ml of a toluene solution of rac-dimethylsilylene-bis(2-methyl-4-phenyl-1-indenyl)zirconium dichloride (0.0001 mmol/ml) synthesized by a publicly known process and 2.3 ml of a toluene solution of triphenylcarbeniumtetra(pentafluorophenyl)borate (0.001 mmol/ml) were added to initiate copolymerization of propylene, ethylene and 1-butene. As the catalyst concentration, the concentration of rac-dimethylsilylene-bis(2-methyl-4-phenyl-1-indenyl)zirconium dichloride was 0.001 mmol/l based on the whole system, and the concentration of triphenylcarbeniumtetra(pentafluorophenyl)borate was 0.003 mmol/l based on the whole system.

During the polymerization, ethylene was continuously fed to maintain the internal pressure at 6.0 kg/cm²G. After 15 minutes from initiation of the polymerization, methyl alcohol was added to terminate the polymerization reaction. The polymer solution was subjected to precipitation, then sufficiently washed with acetone and filtered to obtain solids (copolymer). The solids were dried at 130° C. and 350 mmHg for 12 hours in a stream of nitrogen to obtain a propylene/butene/ethylene copolymer. The yield of the propylene/butene/ethylene copolymer was 24 g, and the copolymer had [η] of 1.9 dl/g, a glass transition temperature Tg of −31° C., an ethylene content of 15% by mol, a butene content of 6% by mol and a molecular weight distribution (Mw/Mn), as measured by GPC, of 2.4. As for the quantity of heat of fusion in the measurement by DSC, a clear peak of fusion was not confirmed.

Example 1

20 Parts by weight of Mitsui polypropylene (i-1) (B101, MFR=0.5, Tm=165° C.) and 80 parts by weight of the propylene/ethylene/butene copolymer (ii-1) obtained in Synthesis Example 1 were kneaded at 200° C. by means of a twin-screw extruder to obtain a propylene polymer composition. The results are set forth in Tables 1 and 2.

Example 2

The procedure of Example 1 was repeated, except that the propylene/butene/ethylene copolymer (ii-1) obtained in Synthesis Example 1 was replaced with the propylene/ethylene/butene copolymer (ii-2) obtained in Synthesis Example 2. The results are set forth in Tables 1 and 2.

Example 3

The procedure of Example 1 was repeated, except that the amount of Mitsui polypropylene (i-1) (B101, MFR=0.5, Tm=165° C.) was changed to 15 parts by weight and the propylene/ethylene/butene copolymer (ii-1) obtained in Synthesis Example 1 was replaced with 85 parts by weight of the propylene/ethylene/butene copolymer (ii-3) obtained in Synthesis Example 3. The results are set forth in Tables 1 and 2.

Example 4

The procedure of Example 3 was repeated, except that the amount of Mitsui polypropylene (i-1) (B101, MFR=0.5, Tm=165° C.) was changed to 25 parts by weight and the amount of the propylene/ethylene/butene copolymer (ii-3) obtained in Synthesis Example 3 was changed to 75 parts by weight. The results are set forth in Tables 1 and 2.

Example 5

The procedure of Example 3 was repeated, except that the propylene/ethylene/butene copolymer (ii-3) obtained in Synthesis Example 3 was replaced with the propylene/ethylene/butene copolymer (ii-4) obtained in Synthesis Example 4. The results are set forth in Tables 1 and 2.

Example 6

The procedure of Example 4 was repeated, except that the propylene/ethylene/butene copolymer (ii-3) obtained in Synthesis Example 3 was replaced with the propylene/ethylene/butene copolymer (ii-4) obtained in Synthesis Example 4. The results are set forth in Tables 1 and 2.

Comparative Example 1

The procedure of Example 1 was repeated, except that the propylene/butene/ethylene copolymer (ii-1) obtained in Synthesis Example 1 was replaced with Tafmer P (ii-6) (available from Mitsui Chemicals, Inc., ethylene/propylene copolymer, C2=80% by mol, [η]=2.5 dl/g). The results are set forth in Tables 1 and 2.

Comparative Example 2

40 Parts by weight of Mitsui polypropylene (i-1) (B101, MFR=0.5, Tm=165° C.) and 60 parts by weight of the propylene/ethylene/butene copolymer (ii-5) obtained in Synthesis Example 5 were kneaded at 200° C. by means of a twin-screw extruder to obtain a propylene polymer composition. The results are set forth in Tables 1 and 2.

TABLE 1

| Items | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Isotactic polypropylene (i-1) MFR (g/10 min) = 0.5, Tm = 165° C., Mw/Mn = 5.5 | 20 | 20 | 15 | 25 | 15 | 25 | 20 | 40 |
| Propylene/butene/ethylene random copolymer (ii-1) [η] = 1.81, TB/{M100 × (Fp/100)$^{0.5}$} = 7.3, C2/C3/C4 (mol %) = 13/68/19 (mol %), M100 = 3.2 MPa | 80 | | | | | | | |
| Propylene/butene/ethylene random copolymer (ii-2) [η] = 2.1, TB/{M100 × (Fp/100)$^{0.5}$} = 1.8, C2/C3/C4 (mol %) = 15/62/23 (mol %), M100= 1.1 MPa | | 80 | | | | | | |
| Propylene/butene/ethylene random copolymer (ii-3) [η] = 1.8, TB/{M100 × (Fp/100)$^{0.5}$} = 2.3, C2/C3/C4 (mol %) = 17/76/7 (mol %), M100 = 0.9 MPa | | | 85 | 75 | | | | |
| Propylene/butene/ethylene random copolymer (ii-4) [η] = 1.51, TB/{M100 × (Fp/100)$^{0.5}$} = 2.4, C2/C3/C4 (mol %) = 17/73/10 (mol %), M100 = 1.0 MPa | | | | | 85 | 75 | | |
| Propylene/butene/ethylene random copolymer (ii-5) [η] = 1.9 TB/{M100 × (Fp/100)$^{0.5}$} = 5.4, C2/C3/C4 (mol %) = 15/79/6 (mol %), M100 = 3.7 MPa | | | | | | | | 60 |
| Ethylene/propylene random copolymer (ii-6) [η] = 2.5, C2/C3 (mol %) = 80/20 (mol %) | | | | | | | 80 | |

Unit of values in Table 1: % by weight

TABLE 2

| Items | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Dynamic viscoelasticity | | | | | | | | |
| (A) Loss tangent tan δ peak (value, temperature (° C.)) | 0.6, 14° C. | 0.9, 18° C. | 0.7, 17° C. | 0.6, 16° C. | 0.7, 18° C. | 0.6, 16° C. | 0.3, 25° C. | 0.5, 18° C. |
| (B) Storage elastic modulus ratio (G' (20° C.))/G' (100° C.)) | 3.8 | 3.5 | 2.5 | 3.1 | 3 | 3.1 | 5.1 | 4.2 |
| (C) Penetration temperature (° C.) | 151 | 150 | 153 | 153 | 153 | 153 | 60 | 153 |
| (D) Residual strain (%) | 12 | 10 | 7 | 7 | 8 | 9 | 32 | 25 |
| Tensile modulus (YM) (MPa) | 25 | 19 | 17 | 31 | 17 | 28 | 22 | 52 |
| Transparency (haze) (%) | 10 | 11 | 12 | 12 | 12 | 12 | 80 | 32 |
| Abrasion resistance (ΔGloss) (%) | 35 | 39 | 31 | 26 | 34 | 30 | 62 | |

Unit of values in Table 2: % by weight

INDUSTRIAL APPLICABILITY

According to the present invention, a propylene polymer composition capable of producing a molded product having excellent transparency, impact resistance, flexibility, heat resistance, scratch resistance and rubber elasticity with a good balance is obtained.

According to the present invention, a molded product using a specific propylene polymer composition exhibits excellent transparency, kink resistance, flexibility, heat resistance, scratch resistance and rubber elasticity with a good balance, and sufficiently satisfies requirements for various uses.

The invention claimed is:

1. A propylene polymer composition comprising 1 to 30 parts by weight of isotactic polypropylene (i) having a melting point of not lower than 150° C. and to 70 to 99 parts by weight of a copolymer (ii) which contains 45 to 80% by mol of a propylene component, 10 to 25% by mol of an ethylene component, and optionally, 7 to 30% by mol a 1-butene component, wherein the copolymer (ii) has a molecular weight distribution (Mw/Mn) of not more than 4.0 as measured by gel permeation chromatography (GPC), and wherein the propylene polymer composition has a tensile modulus (YM), as measured in accordance with JIS 6301, of not more than 100 MPa, and a ratio of a storage elastic modulus G' (20° C.) to a storage elastic modules G' (100° C.) obtained from the dynamic viscoelasticity measurement, G' (20° C.)/G' (100° C.), of not more than 5.

2. The propylene polymer composition of claim 1, wherein the copolymer (ii) further satisfies the following requirement: requirement when a melting point (Tm, ° C.) is present in an endothermic curve measured by a differential scanning calorimeter (DSC), the quantity of heat of fusion ΔH is not more than 30 J/g, and a C3 content (% by mol) and the quantity of heat of fusion ΔH (J/g) satisfy the following relationship:

$$\Delta H < 345\ Ln\ (C3\ content,\ \%\ by\ mol) - 1492,$$

with the proviso that the C3 content satisfies the condition of 76≦C3 content (% by mol)≦90.

3. The propylene polymer composition as claimed in claim 1, wherein in an endothermic curve of the propylene polymer composition measured by a differential scanning calorimeter (DSC), a maximum peak of a melting point (Tm, °C.) is present at not lower than 100° C., and a quantity of heat of fusion of the proplylene polymer composition is in the range of 5 to 40 J/g.

4. The propylene polymer composition as claimed in claim 1, wherein a 1 mm sheet obtained by melt press molding of the propylene polymer composition has a haze of not more than 30%.

5. A propylene polymer composition containing according to claim 1, that contains no styrene or ethyene block copolymer and that satisfies, the following requirements (A), (B), (C) and (D) at the same time:
  (A) in a dynamic viscoelasticity measurement (10 rad/s) in a torsion mode, a peak of loss tangent (tan δ) is present in the range of −25° C. to 25° C., and its value is not less than 0.5,
  (B) a ratio of a storage elastic modulus G' (20° C.) to a storage elastic modulus G' (100° C.) obtained from the dynamic viscoelasticity measurement, G' (20° C.)/G' (100° C.), is not more than 5,
  (C) a penetration temperature (° C.), as measured in accordance with JIS K7196, is in the range of 100° C. to 168° C., and
  (D) a residual strain measured after the lapse of 10 minutes from unloading, said unloading being performed after a 100% strain is given under the conditions of a chuck distance of 30 mm and a pulling rate of 30 mm/min and kept for 10 minutes, is not more than 20%.

6. A molded product comprising the propylene polymer composition of claim 1.

7. The propylene polymer composition of claim 1, wherein the isotactic polypropylene (i) is homopolypropylene.

8. The propylene polymer composition of claim 1, wherein the isotactic polypropylene (i) is a propylene/α-olefin random copolymer.

9. The propylene polymer composition of claim 8, wherein the propylene/α-olefin random copolymer comprises α-olefin selected from ethylene and α-olefins of 4 to 20 carbon atoms.

10. The propylene polymer composition of claim 9, wherein the propylene/α-olefin random copolymer contains said α-olefin in an amount of 0.3 to 7% by mol.

11. The propylene polymer composition of claim 9, wherein the propylene/α-olefin random copolymer contains said α-olefin in an amount of 0.3 to 5% by mol.

12. The propylene polymer composition of claim 1, wherein the copolymer (ii) contains 50 to 75% by mol of the propylene component.

13. The propylene polymer composition of claim 1, wherein the copolymer (ii) contains 10 to 23% by mol of the ethylene component.

14. The propylene polymer composition of claim 1, wherein the copolymer (ii) contains 12 to 23% by mol of the ethylene component.

15. The propylene polymer composition of claim 1, wherein the copolymer (ii) contains 7 to 25% by mol of the 1-butene component.

16. The propylene polymer composition of claim 1, wherein the copolymer (ii) contains 7 to 20% by mol of the 1-butene component.

17. The propylene polymer composition of claim 1, wherein the copolymer (ii) has a crystallinity, as measured by X-ray diffractometry, of not more than 20%.

18. The propylene polymer composition of claim 1, wherein the copolymer (ii) has a molecular weight distribution (Mw/Mn), as measured by gel permeation chromatography (GPC), of not more than 3.0.

* * * * *